US012304192B2

(12) United States Patent
Matsumoto

(10) Patent No.: US 12,304,192 B2
(45) Date of Patent: May 20, 2025

(54) PRINTER AND PRINTING METHOD

(71) Applicant: Roland DG Corporation, Hamamatsu (JP)

(72) Inventor: Sho Matsumoto, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 212 days.

(21) Appl. No.: 18/136,376

(22) Filed: Apr. 19, 2023

(65) Prior Publication Data

US 2023/0339237 A1 Oct. 26, 2023

(30) Foreign Application Priority Data

Apr. 20, 2022 (JP) ................................ 2022-069368

(51) Int. Cl.
*B41J 11/00* (2006.01)

(52) U.S. Cl.
CPC .... *B41J 11/00212* (2021.01); *B41J 11/00216* (2021.01)

(58) Field of Classification Search
CPC ............ B41J 11/00212; B41J 11/00216; B41J 2/16511; B41J 25/001; B41J 11/00222
See application file for complete search history.

(56) References Cited

U.S. PATENT DOCUMENTS

2012/0147080 A1* 6/2012 Kodaira ............ B41J 11/00242 347/17

FOREIGN PATENT DOCUMENTS

WO 2011/024464 A1 3/2011

* cited by examiner

*Primary Examiner* — Bradley W Thies
(74) *Attorney, Agent, or Firm* — Keating & Bennett, LLP

(57) ABSTRACT

A printer includes a print carriage including an ink head, a sub-carriage movable relative to the print carriage, a mount surface where a medium is to be mounted, a dryer to dry an ink ejected from the ink head onto the medium. The sub-carriage includes a temperature sensor and is movable relative to the print carriage to measure a temperature on or above the mount surface using the temperature sensor. The dryer is adjusted such that the temperature to be measured approaches a predetermined temperature.

11 Claims, 8 Drawing Sheets

PRINTER AND PRINTING METHOD

CROSS-REFERENCE TO RELATED APPLICATION

The present application claims priority pursuant to 35 U.S.C. § 119 from Japanese patent application number 2022-069368 filed on Apr. 20, 2022, the entire disclosure of which is hereby incorporated by reference herein.

BACKGROUND OF THE INVENTION

1. Field of the Invention

The present disclosure relates to a printer and a printing method.

2. Description of the Related Art

International Patent Application Publication No. 2011/024464 (WO2011/024464) discloses a printer that moves a carriage to which a temperature sensor and an ink head are mounted, to measure a temperature of a surface (surface to be printed) of a medium, and adjusts a temperature of a dryer (printing heater) based on the measured temperature.

However, according to the printer disclosed in WO2011/024464, when the carriage is moved to measure the temperature, the ink head is moved together with the carriage. Thus, a nozzle of the ink head may dry out, which may cause ink ejection failure.

SUMMARY OF THE INVENTION

A printer according to an aspect of a preferred embodiment of the present disclosure includes a print carriage including an ink head, a sub-carriage movable relative to the print carriage, a mount surface where a medium is to be mounted, a dryer to dry an ink ejected from the ink head onto the medium, wherein the sub-carriage includes a temperature sensor, the sub-carriage is movable relative to the print carriage to measure a temperature on or above the mount surface using the temperature sensor, and the dryer is adjustable such that the temperature to be measured approaches a predetermined temperature.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present disclosure will be described with reference to drawings. The same or equivalent elements, members, and the like illustrated in drawings are given the same symbols, and redundant explanation is omitted as necessary.

First Preferred Embodiment

Figure 1A:
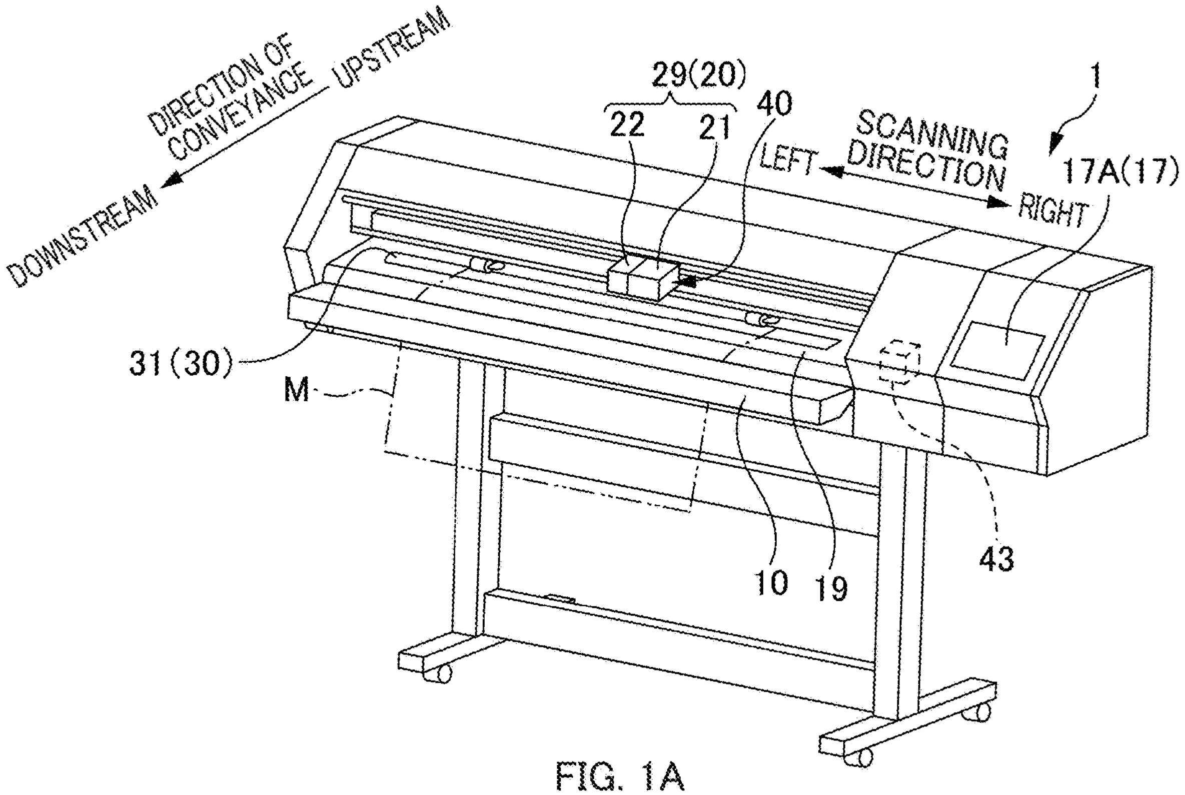
FIGS. 1A and 1B are explanatory diagrams illustrating a basic configuration of a printer 1 of a first preferred embodiment of the present invention.
Figure 1B:
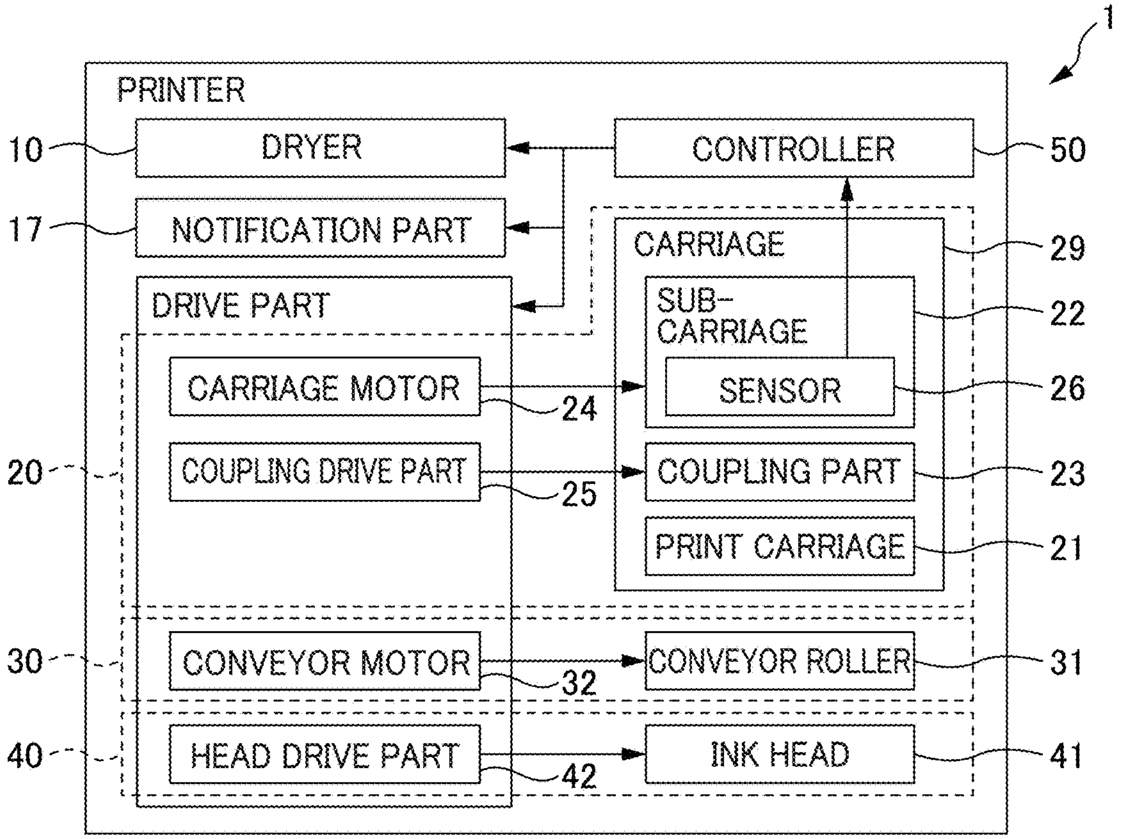

FIGS. 1A and 1B are explanatory diagrams illustrating a basic configuration of a printer 1 of a first preferred embodiment. FIG. 1A is a schematic explanatory diagram illustrating an appearance of the printer 1. FIG. 1B is a block diagram illustrating the printer 1.

In the following explanation, as illustrated in FIG. 1A, a direction of movement of a carriage 29 may be referred to as "scanning direction", a right-side direction as seen from an operator (user) of the printer 1 may be referred to as "right direction (right)", and a left-side direction as seen from the operator of the printer 1 may be referred to as "left direction (left)". Further, a direction of movement of a medium M may be referred to as "direction of conveyance", a supply-side of the medium M may be referred to as "upstream (upstream side)", and a discharge-side of the medium M may be referred to as "downstream (downstream side)". Note that the "scanning direction" includes both of the "right direction" and the "left direction". The "direction of conveyance" is a fixed direction of one way from upstream to downstream.

The printer 1 is an apparatus to print an image on the medium M (printing paper, printing film, etc.). Specifically, the printer 1 is an inkjet printer. The printer 1 performs printing onto the medium M based on a command code prepared by a computer (not illustrated). The computer to give a command to the printer 1 is, for example, a general-purpose personal computer that includes a CPU, a memory, a storage device, a communication part, and the like. The computer may be connected to a display (display device), a keyboard/mouse (input device), and the like. The printer 1 includes a dryer 10, a notification part 17, a carriage unit 20, a bed 19, a conveyor unit 30, a head unit 40, a cap unit 43, and a controller 50.

The dryer 10 is a device to dry an ink ejected from the ink head 41 (described later) of the head unit 40 to the medium M. In the printer 1 according to a preferred embodiment of the present disclosure, the dryer 10 sends air toward the bed 19 that supports the medium M, thereby accelerating the drying of the ink ejected onto the medium M. In the following explanation, the phrase "toward the bed 19 that supports the medium M" may simply be shortened to "toward the medium M".

The notification part 17 is a device to notify the user of a warning, when the temperature of the air from the dryer 10 to the medium M is high, for example. The user who has received the warning can take measures such as suspending the operation of the printer 1, thereby being able to restrain degradation in print quality of the medium M. The notification part 17, as illustrated in FIG. 1A, has a warning display part 17A to display a warning to the user. However, the warning display part 17A may be part of an operating panel through which the user performs an operation related to printing. In this case, the operating panel may further include a display part to display information on printing, such as resolution, ink thickness, and/or the like, a status of the printer 1 during printing, and/or the like, an input part to input information on printing, and/or the like. The notification part 17 may notify the user of a warning by, for example, flashing light, sound, and/or the like, without having the warning display part 17A. Furthermore, the printer 1 does not have to have the notification part 17.

The carriage unit 20 is a unit to move the carriage 29 in the scanning direction. The carriage unit 20 includes the carriage 29, a carriage motor 24, and a coupling drive part 25. The carriage 29 is a member to reciprocate in the scanning direction, and includes a print carriage 21, a sub-carriage 22, and a coupling part 23.

The print carriage 21 is a carriage to which one or a plurality of the ink heads 41 are mounted. In the case where the plural ink heads 41 are mounted to the print carriage 21, the plural ink heads 41 may be arranged in the scanning direction. Further, in the case where the plural ink heads 41 are arranged in the scanning direction, the plural ink heads 41 may be arranged at the positions displaced in the direction of conveyance. The sub-carriage 22 is a carriage that is movable relative to the print carriage 21. In other words, the carriage 29 is separable into the print carriage 21 and the sub-carriage 22. The separated print carriage 21 and sub-carriage 22 are movable relative to each other. In the printer 1 according to a preferred embodiment of the present disclosure, even if the print carriage 21 is located at such a position as to be fixed with respect to the bed 19, the sub-carriage 22 alone can move to a predetermined position in the bed 19, as will be described later. The sub-carriage 22 is a cutting carriage that has a cutting blade to cut the medium M, for example. However, the sub-carriage 22 may be of another type of carriage other than the cutting carriage, as long as it is movable relative to the print carriage 21.

The sub-carriage 22 has a sensor 26 as illustrated in FIG. 1B. The sensor 26 is a temperature sensor to measure temperature. However, the sensor 26 may be an environmental sensor to measure humidity in addition to temperature. In the printer 1 according to a preferred embodiment of the present disclosure, the sensor 26 is a thermometer capable of measuring the temperature of the air in the vicinity of an area in which the ink is discharged, in the surface of the medium M. However, the sensor 26 may be a radiation thermometer (non-contact temperature sensor) capable of measuring the temperature of the surface of the medium M by measuring the intensity of infrared light (infrared energy) radiated from the surface of the medium M. Further, the sensor 26 may be a contact temperature sensor capable of directly measuring the temperature of the surface of the medium M. In the printer 1 according to a preferred embodiment of the present disclosure, the sensor 26 is mounted to the sub-carriage 22, thereby allowing the sensor 26 to be movable relative to the print carriage 21, with the sub-carriage 22. The sensor 26 having measured the temperature outputs a measurement result (at least temperature data) to the controller 50.

The coupling part 23 is a member enabling the print carriage 21 and the sub-carriage 22 to be coupled. The coupling part 23 has two states including a coupled state and a separated state. Here, the "coupled state" is a state in which the print carriage 21 and the sub-carriage 22 are coupled, and the "separated state" is a state in which the coupling between the print carriage 21 and the sub-carriage 22 is released. In the coupled state, the print carriage 21 and the sub-carriage 22 cannot move relative to each other, but move in an integral manner in the scanning direction. In the separated state, the print carriage 21 and the sub-carriage 22 can move relative to each other in the scanning direction. A detailed configuration of the coupling part 23 is described later.

The carriage motor 24 is a motor (drive part) to move at least the sub-carriage 22 in the scanning direction. In the case of the coupled state in which the print carriage 21 and the sub-carriage 22 are coupled, the carriage motor 24 moves both of the print carriage 21 and the sub-carriage 22 in the scanning direction. In the case of the separated state in which the coupling between the print carriage 21 and the sub-carriage 22 are released, the carriage motor 24 moves only the sub-carriage 22 in the scanning direction. That is, in the case of the separated state, the carriage motor 24 moves the sub-carriage 22 relative to the print carriage 21. The carriage motor 24 may be configured with separate motors, which are a motor to move the sub-carriage 22 in the scanning direction and a motor to move the print carriage 21 in the scanning direction. The coupling drive part 25 is a drive part to enable switching between the coupled state and separated state of the coupling part 23.

The bed 19 includes a mount surface where the medium M is to be mounted. Hereinafter, the bed 19 may be simply referred to as "mount surface". The bed 19 faces a nozzle surface of the ink head 41. The length in the scanning direction of the bed 19 is smaller than that of a range in which the carriage 29 can move in the scanning direction. However, the length in the scanning direction of the bed 19 may be equal to or greater than that of a range in which the carriage 29 can move in the scanning direction.

The conveyor unit 30 is a unit to convey the medium M in the direction of conveyance. The medium M to be conveyed may be a long print medium such as rolled paper, and may be a single-cut sheet. Further, the medium M is not limited to paper, but may be film, cloth, or the like. The conveyor unit 30, as illustrated in FIG. 1B, has a conveyor roller 31 and a conveyor motor 32. The conveyor roller 31 is a member to rotate, to thereby convey the medium M in the direction of conveyance. The conveyor motor 32 is a motor (drive part) to rotate the conveyor roller 31. Note that the conveyor unit 30 is not limited to a configuration in which the conveyor roller 31 is used. For example, the conveyor unit 30 may have a conveyor bed (flatbed) and be configured to move this conveyor bed, to thereby convey the medium M in the direction of conveyance.

The head unit 40 is a unit to eject ink to the medium M. As illustrated in FIG. 1B, the head unit 40 includes the ink head 41 and the head drive part 42. The ink head 41 is a head having a nozzle to eject ink. The head unit 40 may further include a processing liquid head to eject processing liquid, in addition to the ink head 41. The head drive part 42 is a drive part to enable switching between ejecting and not ejecting of the ink from the nozzle of the ink head 41. For example, if the head is of a piezo type, the head drive part 42 is a piezo element.

The cap unit 43 is a unit to cover the nozzle surface of the ink head 41. The cap unit 43 is arranged at a home position as illustrated in FIG. 1A. The cap unit 43 includes a cap 18 to cover the nozzle surface of the ink head 41 (see FIG. 3A, etc.) and a cap-moving mechanism (not illustrated) to move the cap 18 in the up-down direction. When the print carriage 21 moves to the home position, the cap-moving mechanism (not illustrated) brings the cap 18 closer to the ink head 41, to thereby cover the nozzle surface of the ink head 41 with the cap 18.

The controller 50 is a control part to control the printer 1. The controller 50 is configured or programmed to control the drive part (carriage motor 24, coupling drive part 25, conveyor motor 32, head drive part 42, etc.) of the printer 1, based on a command code from an external computer. Further, as described later, the controller 50 controls the dryer 10 and the notification part 17, based on the measurement result of the sensor 26.

Figure 2:
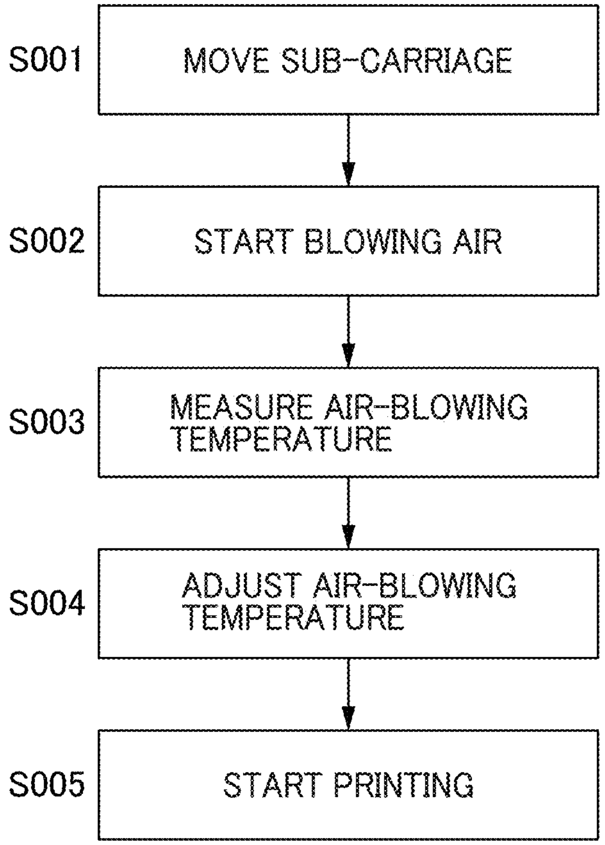
FIG. 2 is a flow diagram of a printing procedure by the printer 1.
Figures 3A, 3B, 3C, 3D:
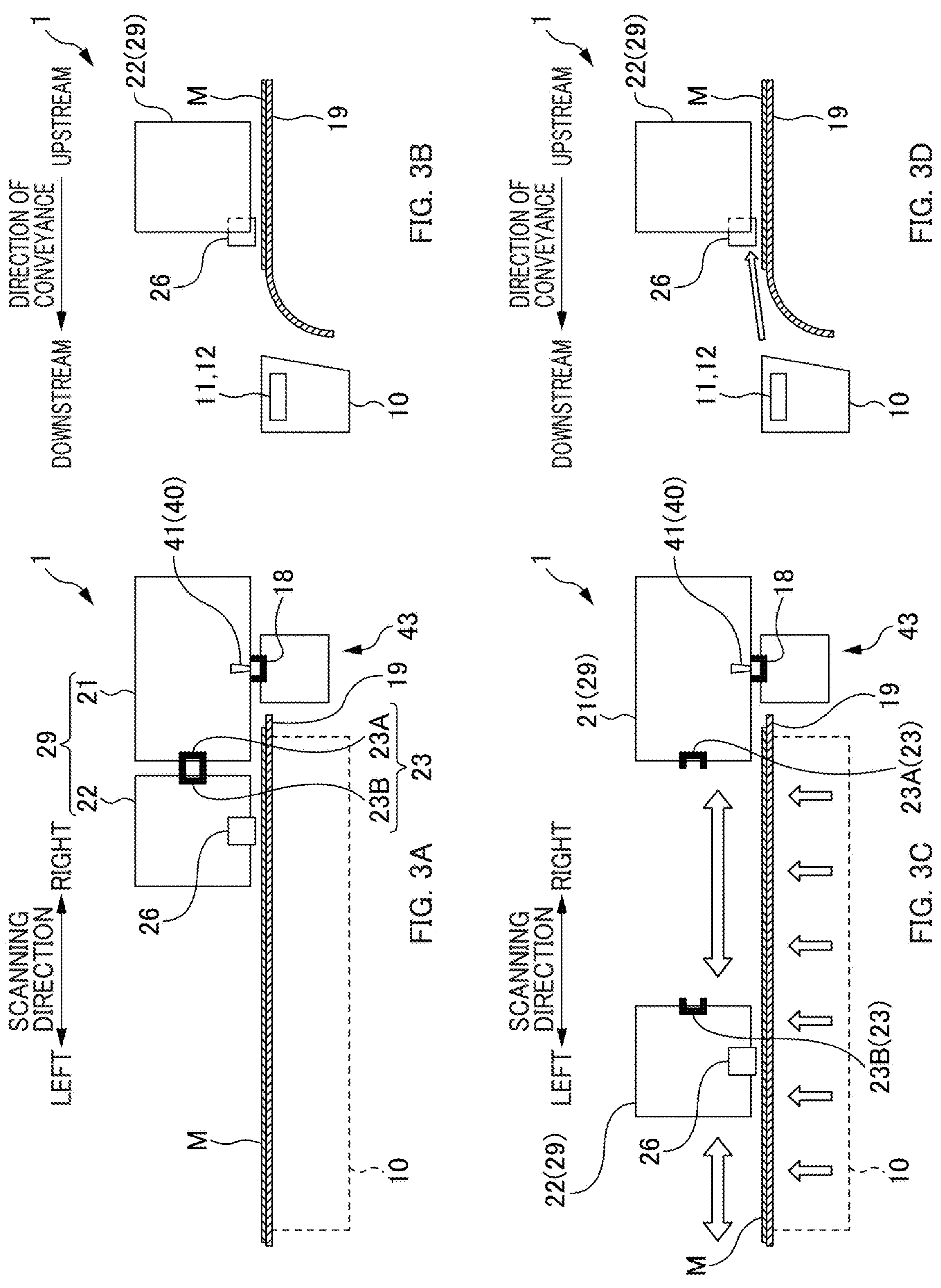
FIGS. 3A to 3D are explanatory diagrams illustrating how a carriage 29 of a first preferred embodiment operates.

FIG. 2 is a flow diagram of a printing procedure by the printer 1. FIGS. 3A to 3D are explanatory diagrams illustrating how a carriage 29 of a first preferred embodiment operates. FIG. 3A illustrates a schematic front view of the printer 1 immediately after the power is turned on. FIG. 3B illustrates a schematic side view of the printer 1 immediately after the power is turned on. FIG. 3C illustrates a schematic front view of the printer 1 after the sub-carriage 22 is moved. FIG. 3D illustrates a schematic side view of the printer 1 after the sub-carriage 22 is moved.

As described above, in the printer 1 according to a preferred embodiment of the present disclosure, the dryer 10 sends air toward the medium M to dry the ink ejected to the medium M. As illustrated in FIGS. 3B and 3D, the dryer 10 includes an air blower 11. The air blower 11 is a member to send air. The air blower 11 is specifically a fan and/or the like. In the printer 1 according to a preferred embodiment of the present disclosure, the air blower 11 sends air to the medium 11, thereby being able to accelerate the drying of the ink ejected to the medium M.

Furthermore, the air blower 11 has an air heater 12. The air heater 12 is a member to heat the air to be sent by the air blower 11. The air heater 12 is specifically a nichrome wire heater or the like. In the printer 1 according to a preferred embodiment of the present disclosure, the air to be sent by the air blower 11 is heated by the air heater 12, and thus the air blower 11 is able to send warm air toward the medium M. Accordingly, it is possible to accelerate the drying of the ink ejected to the medium M. However, the air blower 11 does not have to have the air heater 12. In the case where the air blower 11 does not have the air heater 12, the air blower 11 results in sending the air of normal temperature.

As described above, in the printer 1 according to a preferred embodiment of the present disclosure, the coupling part 23 is a member enabling the print carriage 21 and the sub-carriage 22 to be coupled together. The coupling part 23 has a print carriage side coupling part 23A and a sub-carriage side coupling part 23B. The print carriage side coupling part 23A is a member on the print carriage 21 side in the coupling part 23. The sub-carriage side coupling part 23B is a member on the sub-carriage 22 side in the coupling part 23.

For example, one of the print carriage side coupling part 23A or the sub-carriage side coupling part 23B includes an electromagnet, and the other includes a magnetic material such as a paramagnetic material and a ferromagnetic material. A magnetic field is generated, with an electric current being supplied to the electromagnet, so that the print carriage side coupling part 23A (print carriage 21) and the sub-carriage side coupling part 23B (sub-carriage 22) are coupled to each other (i.e., the coupled state is brought about) by magnetic force. Further, with the supply of the electric current flowing through the electromagnet being stopped or reduced, an attractive force between the electromagnet and the magnetic material can be reduced. In this event, in the state where the print carriage 21 is fixed to a side wall or the like of the printer 1, an external force against the attractive force between the electromagnet and the magnetic material is applied to the sub-carriage 22 by the driving force of the carriage motor 24. With this external force, the sub-carriage 22 can be separated from the print carriage 21 (i.e., the separated state is brought about).

Accordingly, as illustrated in FIG. 1B, the coupling drive part 25 can control the electric current flowing through the electromagnet, so as to switch between the coupled state and the separated state of the coupling part 23, based on the control command from the controller 50. However, the coupling part 23 does not have to have a mechanism in which the electromagnet and the magnetic material are used. The print carriage side coupling part 23A and the sub-carriage side coupling part 23B may include structures engageable with each other (i.e., bringing about the coupled state). And the coupling part 23 may include a mechanism to mechanically release the engaged state (i.e., bringing about the separated state).

Immediately after the printer 1 is turned on, at least the print carriage 21 in the carriage 29, is at a position on the right side in the printer 1, the position not facing the bed 19, as illustrated in FIG. 3A. At this position, the cap 18 (cap unit 43) to cover the nozzle surface of the ink head 41 mounted to the print carriage 21 is arranged. The cap 18 is located on the right side with respect to the bed 19 in the scanning direction. However, the cap 18 may be located on the left side with respect to the bed 19 in the scanning direction or above the bed 19. Immediately after the printer 1 is turned on, the print carriage 21 and the sub-carriage 22 are in the coupled state, and the nozzle surface of the ink head 41 mounted to the print carriage 21 is covered with the cap 18. In the following description, the position of the print carriage 21 at which the nozzle surface of the ink head 41 is covered with the cap 18 may be referred to as "capping position".

In the printing procedure by the printer 1 according to a preferred embodiment of the present disclosure, first, the sub-carriage 22 is moved relative to the print carriage 21 in the state where the print carriage 21 is positioned at the capping position (S001 in FIG. 2). In other words, the coupling drive part 25 switches the print carriage 21 and the sub-carriage 22 from the coupled state to the separated state. Then, with the print carriage 21 being fixed at the capping position, only the sub-carriage 22 is moved in the left direction by the driving force of the carriage motor 24, as illustrated in FIG. 3C. In this event, for example, the sub-carriage 22 is moved to a position in the vicinity of the center of the bed 19. However, the sub-carriage 22 may be moved to a position other than the position in the vicinity of the center, such as a position in the vicinity of the left end of the bed 19.

Next, the air blower 11 starts blowing air (S002 in FIG. 2). In a preferred embodiment of the present disclosure, after the sub-carriage 22 is moved relative to the print carriage 21, the air blower 11 starts blowing air. Note that the air blower 11 may start blowing air before the sub-carriage 22 is moved relative to the print carriage 21 or while the sub-carriage 22 is being moved.

Next, after the sub-carriage 22 is moved relative to the print carriage 21, the temperature of the air blown by the air blower 11 is measured (S003 in FIG. 2). In this event, the sub-carriage 22 to which the sensor 26 is mounted can move left and right in the area on the bed 19 in which the air is blown by the air blower 11 (hereinafter, may be referred to as the "blowing area"). Thus, even if there is a temperature distribution in the blowing area, the sensor 26 can measure the temperature distribution over substantially the entire blowing area. However, the temperature of the air blown by the air blower 11 may be measured while moving the sub-carriage 22 above the bed 19.

If the position of the sensor 26 is fixed with respect to the bed 19, it is needed to provide a plurality of sensors 26 to measure the temperature distribution over substantially the entire blowing area. Meanwhile, in the printer 1 according to a preferred embodiment of the present disclosure, the single sensor 26 can measure the temperature distribution in substantially the entire blowing area. However, the sub-carriage 22 may be provided with a plurality of sensors 26.

Next, the dryer 10 is adjusted such that the temperature to be measured by the sensor 26 approaches the predetermined temperature (S004 in FIG. 2). Specifically, in the printer 1 according to a preferred embodiment of the present disclosure, the output of the air blower 11 is adjusted. That is, the controller 50 having received the measurement result of the sensor 26 transmits a control command to adjust the heating temperature of the air heater 12 to the dryer 10. In the printer 1 according to a preferred embodiment of the present disclosure, the temperature of the air blown by the air blower 11 can be adjusted by adjusting the heating temperature of the air heater 12. However, for example, when the air blower 11 have no air heater 12 (when the air blower 11 blows air at normal temperature), or when the air heater 12 is not used to blow air (in an air blowing mode) even if the air blower 11 has the air heater 12, the air blowing volume and the air blowing time of the air blower 11 may be adjusted. Finally, after adjusting the dryer 10, printing is started (S005 in FIG. 2). In other words, the coupling drive part 25 switches the print carriage 21 and the sub-carriage 22 from the separated state to the coupled state. Then, the print carriage 21 and the sub-carriage 22 are integrally moved in the scanning direction by the driving force of the carriage motor 24, to thereby perform printing.

The steps from S001 to S004 in FIG. 2 described above may be performed without the medium M being mounted on the bed 19. The output of the dryer 10 can be adjusted in advance, before mounting the medium M on the bed 19 and preparing for printing.

In the printer 1 according to a preferred embodiment of the present disclosure described above, when the temperature is measured by the sensor 26, the sub-carriage 22 is moved relative to the print carriage 21 in the state where the print carriage 21 is at the capping position. This makes it possible to measure the temperature while restraining the ink head 41 from drying out. This point will be described through comparison with the carriage 60 in a printer 9 of the comparative example.

Figure 4B:
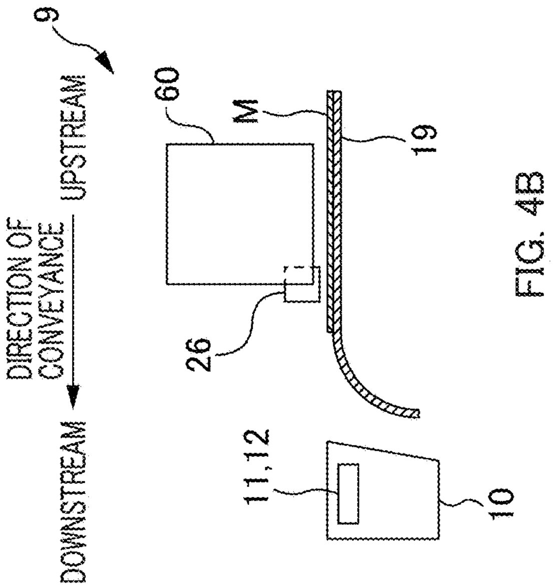
FIGS. 4A to 4D are explanatory diagrams of how a carriage 60 of a comparative example operates.
Figure 4D:
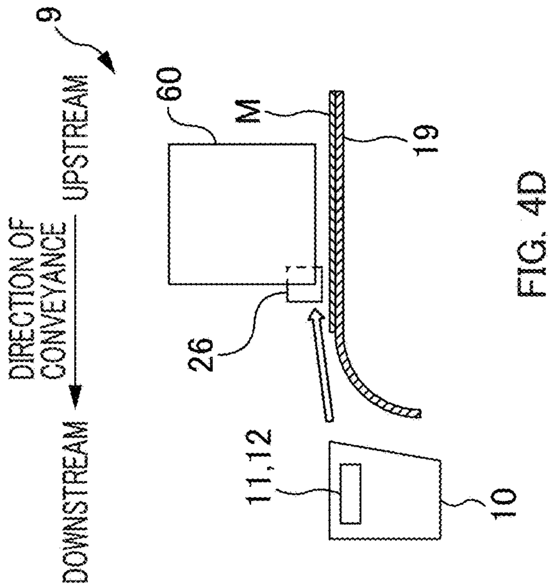
Figure 4A:
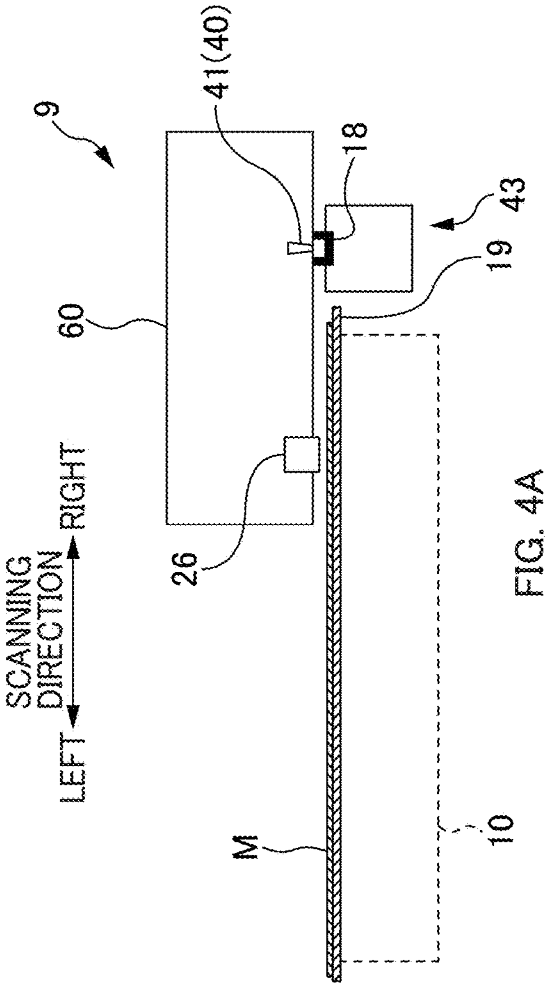
Figure 4C:
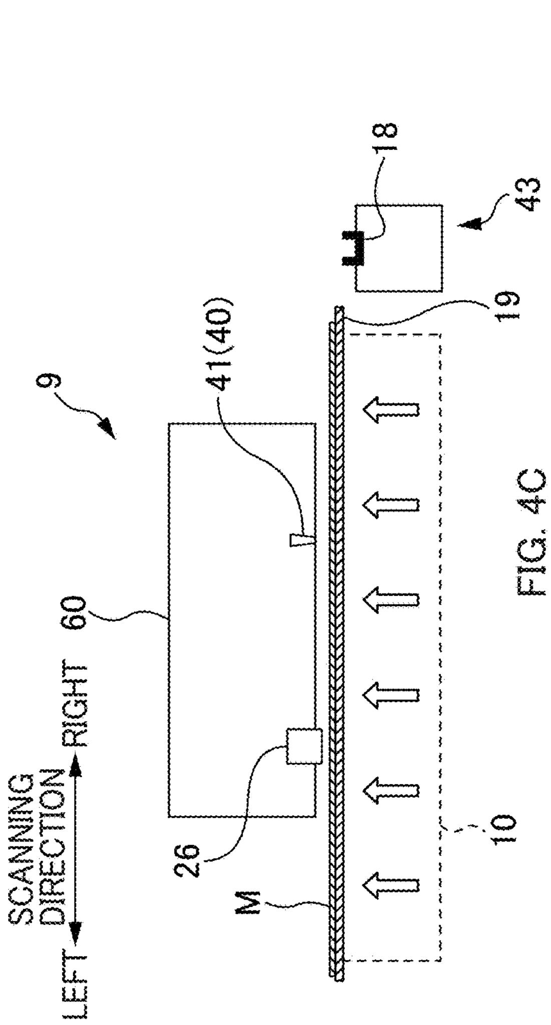

FIGS. 4A to 4D are explanatory diagrams of how a carriage 60 of a comparative example operates. FIG. 4A illustrates a schematic front view of the printer 9 immediately after the power is turned on. FIG. 4B illustrates a schematic side view of the printer 9 immediately after the power is turned on. FIG. 4C illustrates a schematic front view of the printer 9 after the carriage 60 is moved. FIG. 4D illustrates a schematic side view of the printer 9 after the carriage 60 is moved.

In contrast to the carriage 29 according to a preferred embodiment of the present disclosure, the carriage 60 of the comparative example does not have a configuration in which the print carriage and sub-carriage are separated, as illustrated in FIGS. 4A and 4B. Accordingly, the sensor 26 and the ink head 41 are mounted to the carriage 60 which is integrally configured. Accordingly, in response to the carriage 60, to which the sensor 26 is mounted, moving to measure the temperature, the ink head 41 also moves simultaneously, as illustrated in FIG. 4C. That is, when the carriage 60 moves, the ink head 41 moves from the capping position, resulting in the state of having the cap 18 removed from the state of being covered therewith. Then, as illustrated in FIGS. 4C and 4D, the ink head 41 may dry out when the temperature is measured. In particular, the nozzle surface of the ink head 41 is exposed to the air blown from the air blower 11, which may increase the damage to the ink head 41.

Meanwhile, in the printer 1 according to a preferred embodiment of the present disclosure described above, the sub-carriage 22, to which the sensor 26 is mounted, is moved relative to the print carriage 21, to which the ink head 41 is mounted, and the temperature on the bed 19 is measured by a sensor 26. This makes it possible to measure the temperature while restraining the ink head 41 from drying out. Then, the output of the dryer 10 can be adjusted based on the measurement temperature.

Second Preferred Embodiment

Figures 5A, 5B, 5C, 5D:
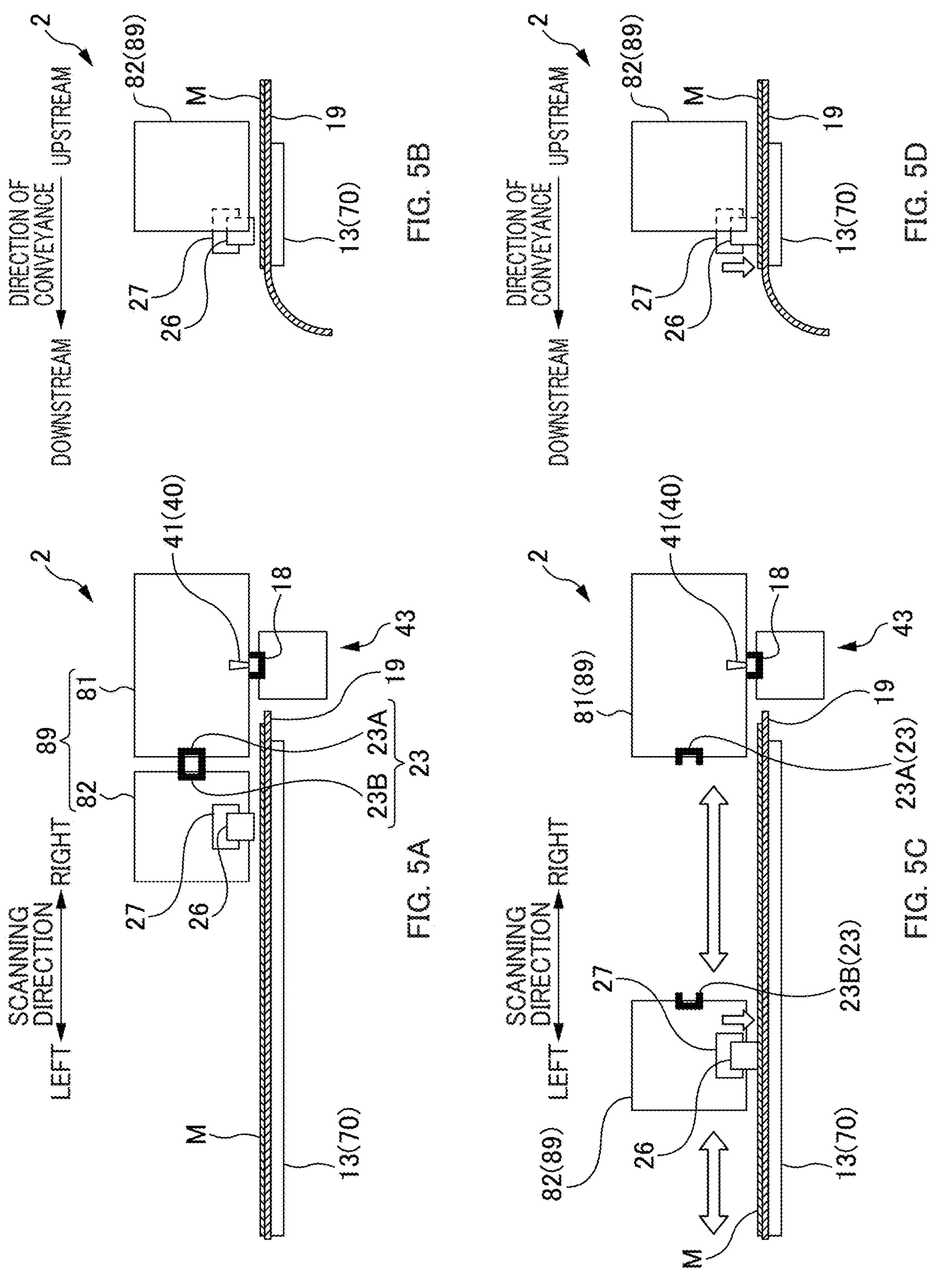
FIGS. 5A to 5D are explanatory diagrams illustrating how a carriage 89 of a second preferred embodiment operates.
Figure 6:
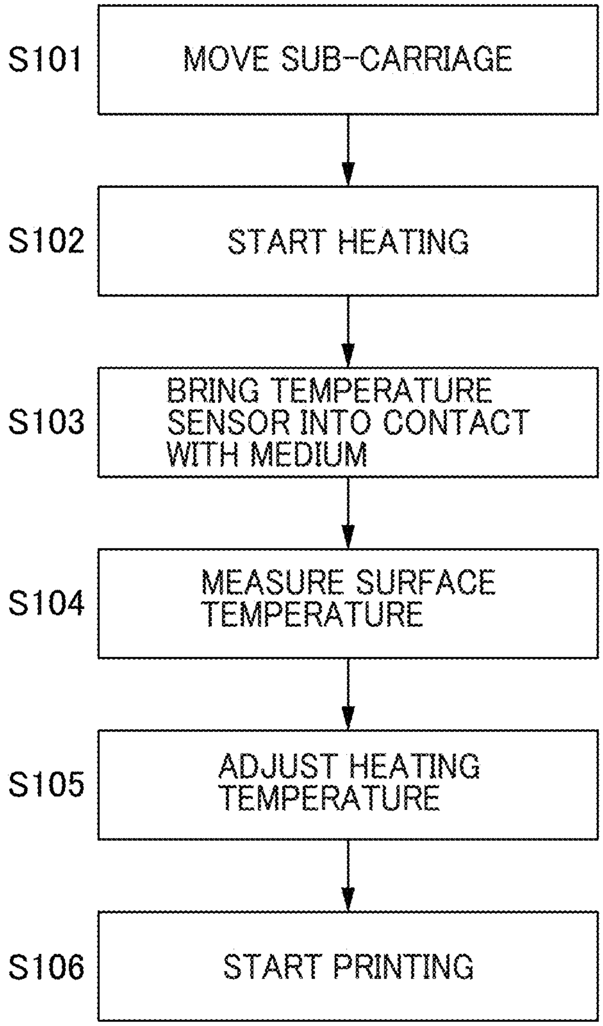
FIG. 6 is a flow diagram illustrating a printing procedure by a printer 2 of a second preferred embodiment of the present invention.

FIGS. 5A to 5D are explanatory diagrams of how a carriage 89 according to a second preferred embodiment operates. FIG. 5A illustrates a schematic front view of the printer 2 immediately after the power is turned on. FIG. 5B illustrates a schematic side view of the printer 2 immediately after the power is turned on. FIG. 5C illustrates a schematic front view of the printer 2 after a sub-carriage 82 is moved. FIG. 5D illustrates a schematic side view of the printer 2 after the sub-carriage 82 is moved. FIG. 6 is a flow diagram of a printing procedure by the printer 2 in the second preferred embodiment.

The printer 1 of the first preferred embodiment described above preferably includes the air blower 11 to blow warm air or normal temperature air onto the bed 19, as the dryer 10 to dry ink ejected to the medium M. However, the dryer is not limited to including the air blower, but may include a medium heater 13 to heat the medium M, as in the printer 2 according to a preferred embodiment of the present disclosure, for example. Then, the sensor 26 may measure the temperature of the surface of the medium M.

In the printer 2 of a preferred embodiment of the present disclosure, a dryer 70 includes the medium heater 13 as illustrated in FIGS. 5A to 5D. The medium heater 13 is a device to heat the medium M. The medium heater 13 is located below the bed 19 and heats the medium M through the bed 19. Then, the sensor 26 measures the surface temperature of the medium M from above the medium M.

In addition, in the printer 2 according to a preferred embodiment of the present disclosure, the sub-carriage 82 includes a lifting mechanism 27 to raise and lower the sensor 26, as illustrated in FIGS. 5C and 5D. However, the lifting mechanism 27 to raise and lower the sensor 26 may not be provided. Specifically, the lifting mechanism 27 is a solenoid or the like. With the sensor 26 being moved downward by the lifting mechanism 27, it is possible to measure the temperature at a position in the vicinity of the medium M. That is, in measuring the temperature of the medium M, it is possible to reduce the distance between the sensor 26 and the medium M to be measured, thereby being able to accurately measure the temperature of the medium M. Furthermore, in the printer 2 of a preferred embodiment of the present disclosure, it is possible to measure the temperature, with the sensor 26 being brought into contact with the medium M. This makes it possible to directly measure the temperature of the surface of the medium M, thereby being able to measure the temperature of the medium M more accurately.

Other features of the printer 2 according to a preferred embodiment of the present disclosure are the same as those of the printer 1 according to the first preferred embodiment described above. That is, in the printer 2 according to a preferred embodiment of the present disclosure as well, when the temperature is measured by the sensor 26, the sub-carriage 82 is moved relative to a print carriage 81 in the state where the print carriage 81 is at the capping position. This makes it possible to measure the temperature while restraining the ink head 41 from drying out.

In the printing procedure by the printer 2, first, as described above, the sub-carriage 82 is moved relative to the print carriage 81 (S101 in FIG. 6). In other words, the coupling drive part 25 switches the print carriage 81 and the sub-carriage 82 from the coupled state to the separated state. Then, in the state where the print carriage 81 being fixed at the capping position, only the sub-carriage 82 is moved in the left direction by the driving force of the carriage motor 24, as illustrated in FIG. 5C. In this event, for example, the sub-carriage 82 is moved to a position in the vicinity of the center of the bed 19. However, the sub-carriage 82 may be moved to a position other than the position in the vicinity of the center, such as a position in the vicinity of the left end of the bed 19.

Next, heating by the medium heater 13 is started (S102 in FIG. 6). In a preferred embodiment of the present disclosure, after the sub-carriage 82 is moved relative to the print carriage 81, the medium heater 13 starts heating. Note that the heating by the medium heater 13 may be started, before the sub-carriage 82 is moved relative to the print carriage 81 or while the sub-carriage 82 is being moved.

Next, the lifting mechanism 27 moves the sensor 26 toward the medium M and brings it into contact with the medium M (S103 in FIG. 6). This makes it possible to directly measure the temperature of the surface of the medium M after the sub-carriage 22 is moved relative to the print carriage 21 (S104 in FIG. 6). However, the lifting mechanism 27 does not have to move the sensor 26 toward the medium M to the position at which the sensor 26 contacts the medium M. The sub-carriage 82 to which the sensor 26 is mounted can move left and right over the area on the bed 19 that is to be heated by the medium heater 13 (hereinafter may be referred to as "heating area"). Thus, even if there is a temperature distribution in the heating area, the sensor 26 can measure the temperature distribution over substantially the entire heating area. When the lifting mechanism 27 is not provided, the temperature near the surface of the medium M may be measured with the sub-carriage 22 being moved above the bed 19.

Next, the dryer 70 is adjusted such that the temperature to be measured approaches the predetermined temperature (S105 in FIG. 6). Specifically, in the printer 2 of a preferred embodiment of the present disclosure, the heating temperature of the medium heater 13 is adjusted. That is, the controller 50 having received the measurement result of the sensor 26 transmits a control command to adjust the heating temperature of the medium heater 13, to the dryer 70. Finally, after adjusting the dryer 70, printing is started (S106 in FIG. 6). In other words, the coupling drive part 25 switches the print carriage 81 and the sub-carriage 82 from the separated state to the coupled state. Then, the print carriage 81 and the sub-carriage 82 are integrally moved in the scanning direction by the driving force of the carriage motor 24, to thereby perform printing.

The steps from S101 to S105 in FIG. 6 described above may be performed without the medium M being mounted on the bed 19. That is, the sensor 26 may be brought into contact with the surface of the bed 19. The output of the dryer 70 can be adjusted in advance, before mounting the medium M on the bed 19 and preparing for printing.

Figure 7A:
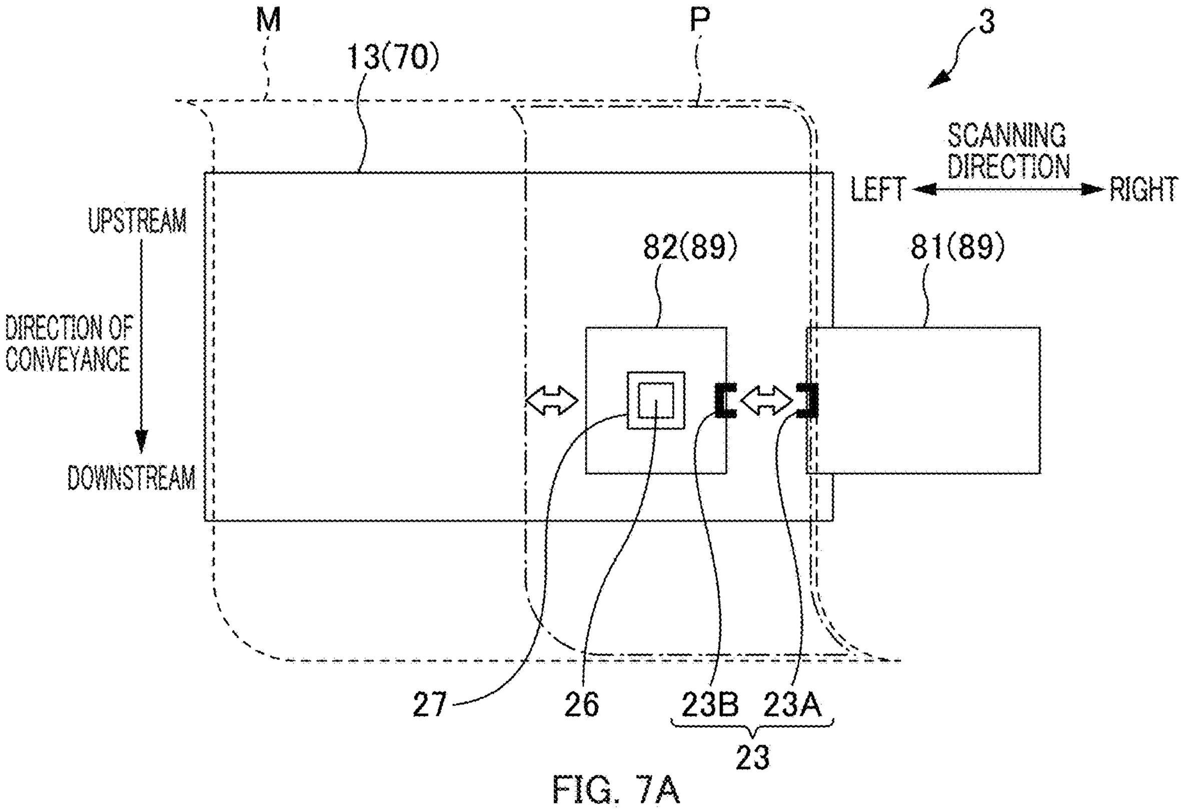
FIG. 7A is an explanatory diagram illustrating a printer 3 of a first modification.
Figure 7B:
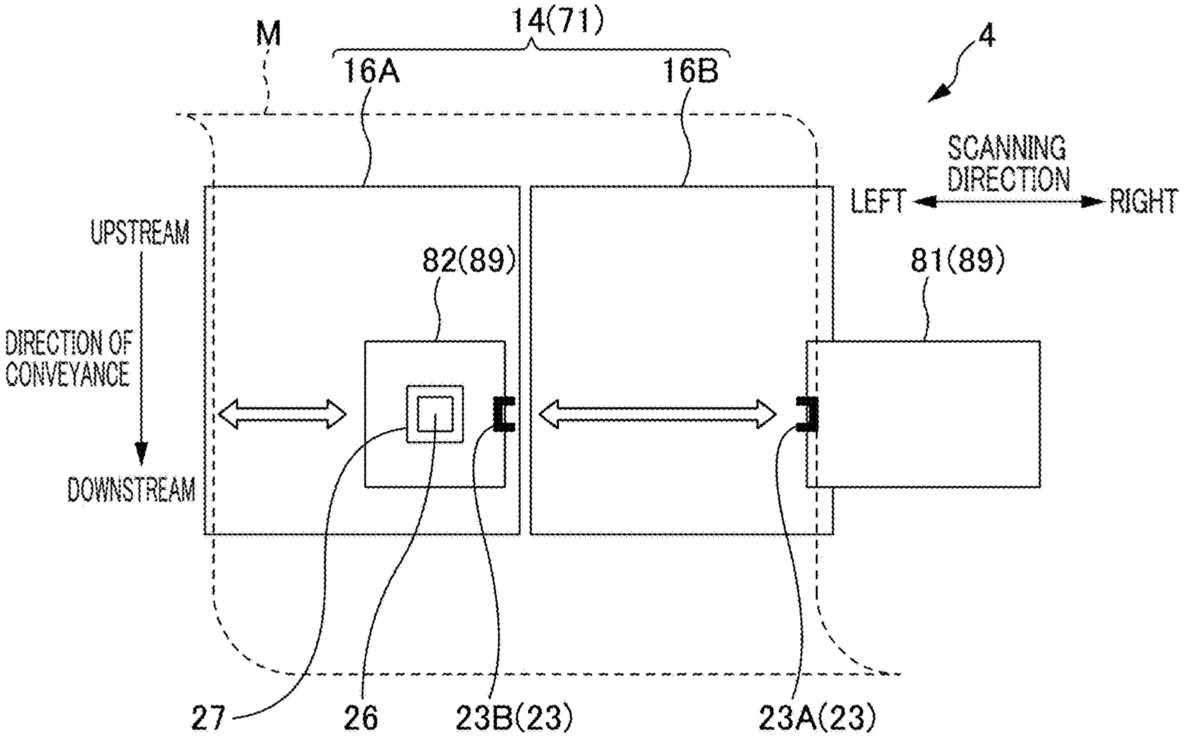
FIG. 7B is an explanatory diagram illustrating a printer 4 of a second modification.
Figure 8A:
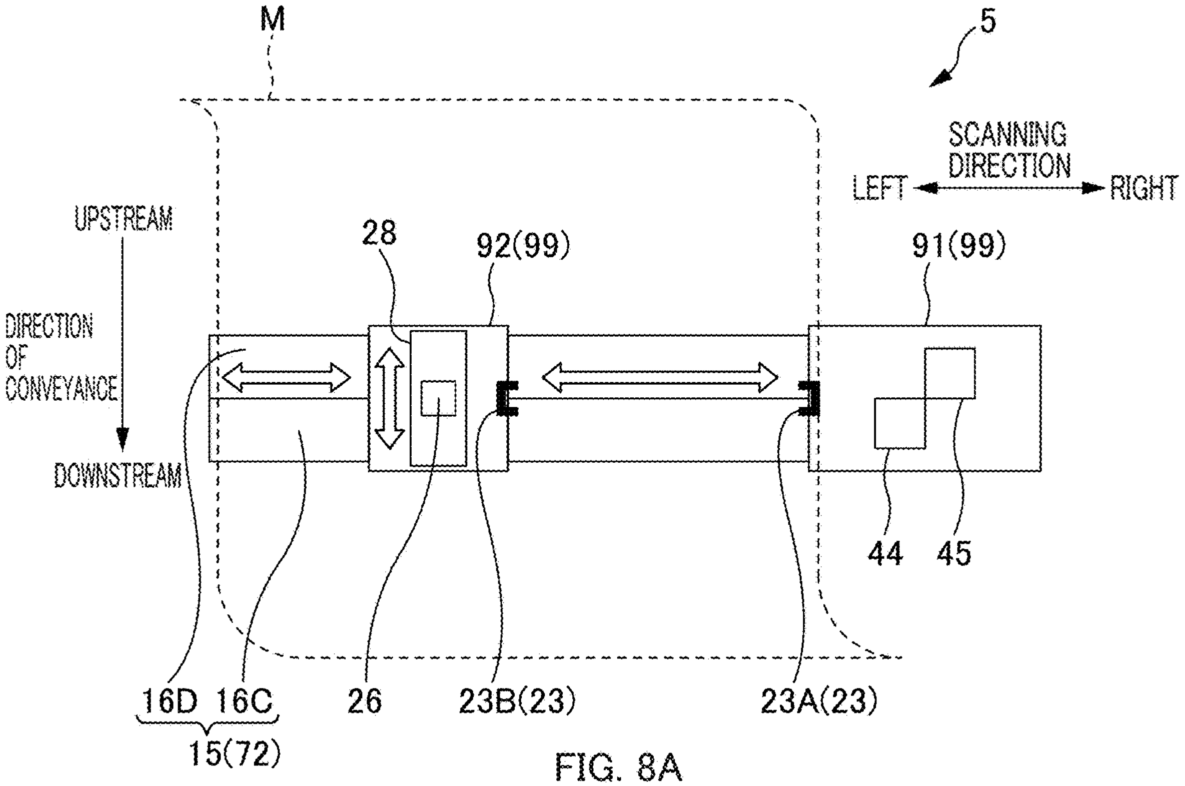
FIGS. 8A and 8B are explanatory diagrams illustrating a printer 5 of a third modification.
Figure 8B:
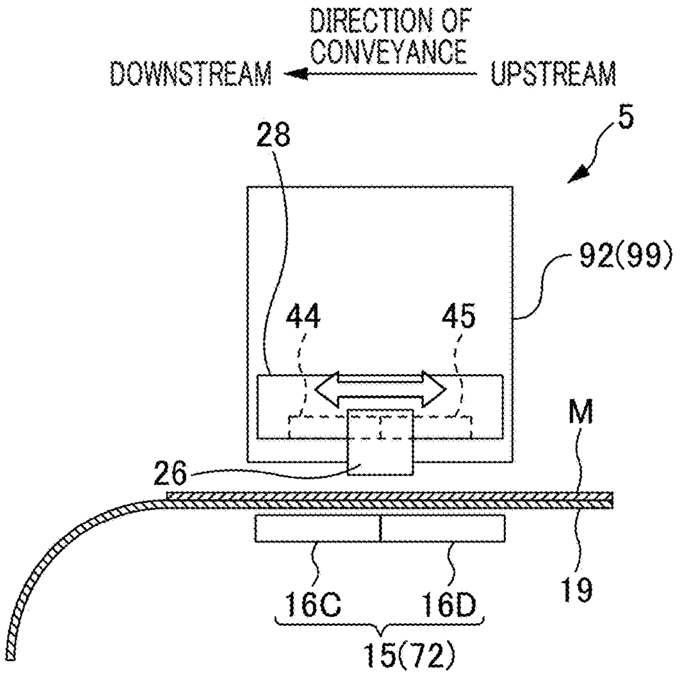

FIG. 7A is an explanatory diagram of a printer 3 in a first modification of a preferred embodiment of the present invention, and FIG. 7B is an explanatory diagram of a printer 4 in a second modification of a preferred embodiment of the present invention. FIGS. 8A and 8B are explanatory diagrams of a printer 5 of a third modification of a preferred embodiment of the present invention. FIG. 8A illustrates a schematic plan view of the printer 5, and FIG. 8B illustrates a schematic side view of the printer 5 (in particular, a sub-carriage 92).

First Modification

In the printer 2 of the second preferred embodiment described above, printing is performed in the entire area of the medium M. However, as illustrated in FIG. 7A, only a portion of the printable range may be used for printing, such as when printing is performed only on a partial area P of the medium M.

Accordingly, in the printer 3 of the first modification, as illustrated in FIG. 7A, the range in which the temperature is measured by the sensor 26 can be changed according to the area to which the ink is ejected in the surface of the medium M. In other words, the range in which the temperature is measured by the sensor 26 can be changed according to the area to be used for printing of the medium M. In the printer 3, the sensor 26 can move left and right on or above the heating area to be heated by the medium heater 13, and thus it is easy to change the range in which the temperature is measured by the sensor 26. This makes it possible to measure the temperature only in the area P to be printed, when only a portion of the printable range of the medium M is used for printing, for example. This can further improve the printing quality of the medium M.

Second Modification

In the printer 2 of the second preferred embodiment described above, the medium heater 13 has an integral heating area that is not divided. However, the medium heater may be divided in the scanning direction, for example, and the heating temperature of the medium heater may be adjusted for each divided heating area.

In the printer 4 of the second modification, a medium heater 14 of a dryer 71 includes a first area 16A and a second area 16B obtained by being divided in the scanning direction, as illustrated in FIG. 7B. The first area 16A and the second area 16B are areas different from each other in the medium heater 14. Further, the sensor 26 can measure each of the temperature of an area corresponding to the first area 16A (hereinafter may be referred to as "first measurement temperature") and the temperature of an area corresponding to the second area 16B (hereinafter may be referred to as a "second measurement temperature") in the surface of the medium M. In the printer 4, the sensor 26 can move left and right on or above the heating area of the medium heater 14, thereby facilitating measurement of the temperature of each divided heating area by the sensor 26.

Further, in the printer 4, the heating temperature of the first area 16A and the heating temperature of the second area 16B can be adjusted respectively based on the first measurement temperature and the second measurement temperature. Accordingly, when the medium heater 14 is divided into components, the heating temperature can be adjusted for each of the divided components. Here, a description has been given of an example in which the medium heater 14 is divided into two areas in the scanning direction, but the number of the areas obtained by dividing the medium heater 14 may be more than two.

In the printer 4 of the second modification described above, the medium heater 14 is divided in the scanning direction, and the heating temperature of the medium heater 14 is adjusted for each of the divided heating areas. However, the medium heater may be divided in the direction of conveyance of the medium M, and the heating temperature of the medium heater may be adjusted for each of the divided heating areas. In this event, the sensor 26 may be movable, for example, in the direction of conveyance of the medium M, as illustrated in FIGS. 8A and 8B.

In the printer 5 of the third modification, a medium heater 15 of a dryer 72 includes a third area 16C and a fourth area 16D obtained by being divided in the direction of conveyance, as illustrated in FIG. 8A. The third area 16C and the fourth area 16D are areas different from each other in the medium heater 15. The sub-carriage 92 has a moving mechanism 28 as illustrated in FIGS. 8A and 8B. The moving mechanism 28 is a mechanism to move the sensor 26 in a direction parallel to the surface of the medium M and in a direction intersecting the direction of movement of the sub-carriage 92. The moving mechanism 28 is specifically a screw mechanism or a belt mechanism. This makes it possible to measure the temperature distribution of the medium M in the direction of conveyance. In addition, when the medium heater 15 is divided into components, the heating temperature can be adjusted for each of the divided components. Here, a description has been given of an example in which the medium heater 15 is divided into two areas in the direction of conveyance, but the number of the areas obtained by dividing the medium heater 15 may be more than two.

In the printer 5 of the third modification, the plurality of ink heads 41 may be arranged such that they are shifted in the direction of conveyance. Specifically, as illustrated in FIG. 8A, a first ink head 44 and a second ink head 45 are arranged such that they are shifted from each other in the direction of conveyance. An aspect of the arrangement of the first ink head 44 and the second ink head 45 is not limited to that illustrated in FIG. 8A. The first ink head 44 and the second ink head 45 may be arranged so as to have a gap in the direction of conveyance, or may be arranged so as to partially overlap each other. In this case, the medium heater 15 may be divided, in the direction of conveyance, into a third area 16C and a fourth area 16D, which are areas respectively corresponding to the ink heads (first ink head 44 and second ink head 45). This makes it possible to adjust the heating temperature of the medium heater 15 for each of the areas to which each of the ink head 41 ejects ink.

As illustrated in FIGS. 1A and 1B, the printer 1 described above includes a print carriage 21 including an ink head 41, a sub-carriage 22 movable relative to the print carriage 21, a bed 19 on which a medium M is to be mounted, and a dryer 10 to dry the ink ejected to the medium M from the ink head 41. The sub-carriage 22 includes a temperature sensor (sensor 26). Then, as illustrated in FIGS. 3C and 3D, the sub-carriage 22 is moved relative to the print carriage 21, to measure the temperature on or above the bed 19 (i.e., the temperature of the surface of the bed 19, the area above the surface of the bed 19, and the medium M mounted on the bed 19) using the sensor 26, and the dryer 10 is adjusted such that the temperature to be measured approaches a predetermined temperature. This makes it possible to measure the temperature while restraining the ink head 41 from drying out, and adjust the output of the dryer 10 based on the measured temperature.

Furthermore, in the printer 1 described above, as illustrated in FIGS. 3B and 3D, it is preferable that the dryer 10 includes an air blower 11 configured to blow air toward the medium M, and the sensor 26 measures the temperature of the air blown by the air blower 11. This makes it possible to adjust the output of the air blower 11, when the dryer 10 includes the air blower 11 to blow air to the medium M.

Furthermore, in the printer 1 described above, as illustrated in FIGS. 3B and 3D, it is preferable that the air blower 11 includes an air heater 12 configured to heat the air, and the air heater 12 is adjusted such that the temperature to be measured by the sensor 26 approaches the predetermined temperature. This makes it possible to adjust the temperature of the air blown by the air blower 11, when the dryer 10 includes the air blower 11 to blow warm air to the medium M.

Furthermore, it is preferable that the printer 1 described above has a notification part 17 configured to notify the user of a warning when the temperature measured by the sensor 26 is equal to or higher than a warning temperature, the warning temperature being higher than the predetermined temperature, as illustrated in FIGS. 1A and 1B. This makes it possible to notify the user when the temperature of the air blown to the medium M is high.

Furthermore, in the printer 2 described above, as illustrated in FIGS. 5A to 5D, it is preferable that the dryer 70 has the medium heater 13 configured to heat the medium M, and the sensor 26 measures the temperature of a surface of the medium M. This makes it possible to adjust the output of the medium heater 13 when the dryer 70 includes the medium heater 13 to heat the medium M.

Furthermore, in the printer 2 described above, as illustrated in FIGS. 5C and 5D, it is preferable that the sub-carriage 22 has the lifting mechanism 27 configured to raise and lower the sensor 26, and the sensor 26 is lowered to contact the medium M, to measure the temperature of the surface of the medium M. This makes it possible to directly measure the temperature of the surface of the medium M.

Furthermore, in the printer 4 described above, as illustrated in FIG. 7B, it is preferable that the medium heater 14 includes the first area 16A and the second area 16B different from the first area 16A. In addition, the sensor 26 measures each of the first measurement temperature in the area corresponding to the first area 16A and the second measurement temperature in the area corresponding to the second area 16B, in the surface of the medium M. Then, the heating temperature of the first area 16A and the heating temperature of the second area 16B are respectively adjusted such that the first measurement temperature approaches a first predetermined temperature and the second measurement temperature approaches a second predetermined temperature. Accordingly, when the medium heater 14 is divided into components, the heating temperature can be adjusted for each of the divided components.

Furthermore, in the printer 1 described above, as illustrated in FIG. 3C, it is preferable that the print carriage 21 includes the cap 18 to cover the nozzle surface of the ink head 41, and the sub-carriage 22 is moved relative to the print carriage 21, in the state where the print carriage 21 is positioned at the capping position, the capping position being a position at which the nozzle surface of the ink head

41 is covered with the cap 18. This makes it possible to measure the temperature while restraining the ink head 41 from drying out.

Furthermore, in the printer 2 described above, as illustrated in FIGS. 5C and 5D, it is preferable that the sub-carriage 82 has the lifting mechanism 27 configured to raise and lower the sensor 26. This makes it possible to measure the temperature at a position in the vicinity of the medium M.

Furthermore, in the printer 5 described above, as illustrated in FIGS. 8A and 8B, it is preferable that the sub-carriage 92 has the moving mechanism 28 configured to move the sensor 26 in a direction parallel to a surface of the medium M and in a direction intersecting the direction of movement of the sub-carriage 92. This makes it possible to measure the temperature distribution of the medium M in the direction of conveyance.

Furthermore, in the printer 3 described above, as illustrated in FIG. 7A, it is preferable that the sub-carriage 82 changes the range in which the temperature is measured by the sensor 26 according to the area P, to which the ink is ejected, in the surface of the medium M. This makes it possible to measure the temperature in the area for printing when only a portion of the printable range is used for printing.

As illustrated in FIGS. 1A and 1B, the printer 1 described above comprises the print carriage 21 including the ink head 41, the sub-carriage 22 movable relative to the print carriage 21, the sub-carriage 22 including the temperature sensor (sensor 26), the bed 19 where the medium M is to be mounted, and the dryer 10 configured to dry the ink ejected to the medium M from the ink head 41. A printing method using the printer 1 described above includes moving the sub-carriage 22 relative to the print carriage 21, measuring the temperature on or above the bed 19 using the sensor 26, and adjusting the dryer 10 such that the temperature to be measured approaches a predetermined temperature. This makes it possible to measure the temperature, while restraining the ink head 41 from drying out, and adjust the output of the dryer 10, based on the measurement temperature.

Other Preferred Embodiments

As a dryer included in the printer described above, the first preferred embodiment describes an aspect of including the air blower 11 to blow air toward the medium M, and the second preferred embodiment describes an aspect of including the medium heater 13 to heat the medium M. However, the dryer is not limited to one of an air blower or a medium heater, and both of them may be combined. For example, the dryer may have both an air blower and a medium heater.

In the printer 2 of the second preferred embodiment mentioned above, a description has been given such that the sub-carriage 82 includes the lifting mechanism 27 to raise and lower the sensor 26. However, in the printer 1 of the first preferred embodiment as well the sub-carriage 22 may include the lifting mechanism 27. This makes it possible to measure the temperature at a position in the vicinity of the medium M.

In the printer 5 of the third modification mentioned above, a description has been given such that the sub-carriage 92 includes the moving mechanism 28 to move the sensor 26 in a direction parallel or substantially parallel to the surface of the medium M and in a direction intersecting the direction of movement of the sub-carriage 92. However, the sub-carriage may include both the lifting mechanism 27 and the moving mechanism 28. This makes it possible to measure the temperature at a position in the vicinity of the medium M, and measure the temperature distribution in the direction of conveyance of the medium M as well.

The present disclosure is directed to enabling measurement of the temperature while restraining the ink head from drying out, and adjustment of the output of the dryer based on the measured temperature.

According to preferred embodiments of the present disclosure and modifications thereof, it is possible to measure the temperature while restraining the ink head from drying out, and to adjust the output of the dryer based on the measured temperature.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printer comprising:
- a print carriage including an ink head;
- a sub-carriage movable relative to the print carriage;
- a mount surface where a medium is to be mounted;
- a dryer to dry an ink ejected from the ink head onto the medium; wherein
- the sub-carriage includes a temperature sensor;
- the sub-carriage is movable relative to the print carriage to measure a temperature on or above the mount surface using the temperature sensor; and
- the dryer is adjustable such that the temperature to be measured approaches a predetermined temperature.

2. The printer according to claim 1, wherein
- the dryer includes an air blower to blow air toward the medium; and
- the temperature sensor is operable to measure a temperature of the air blown by the air blower.

3. The printer according to claim 2, wherein
- the air blower includes an air heater to heat the air; and
- the air heater is adjustable such that the temperature to be measured by the temperature sensor approaches the predetermined temperature.

4. The printer according to claim 2, further comprising a notifier to notify a user of a warning when the temperature measured by the temperature sensor is equal to or higher than a warning temperature, the warning temperature being higher than the predetermined temperature.

5. The printer according to claim 1, wherein
- the dryer includes a medium heater to heat the media; and
- the temperature sensor to measure a temperature of a surface of the medium.

6. The printer according to claim 5, wherein
- the sub-carriage includes a lifting mechanism to raise and lower the temperature sensor; and
- the temperature sensor is lowered to contact the medium, to measure the temperature of the surface of the medium.

7. The printer according to claim 5, wherein
- the medium heater includes a first area and a second area different from the first area;
- the temperature sensor is operable to measure each of a first measurement temperature of an area corresponding to the first area and a second measurement temperature of an area corresponding to the second area, in the surface of the medium; and
- a heating temperature of the first area and a heating temperature of the second area are respectively adjusted such that the first measurement temperature approaches a first predetermined temperature and the second measurement temperature approaches a second predetermined temperature.

8. The printer according to claim 1, further comprising:

a cap to cover a nozzle surface of the ink head; wherein the sub-carriage is movable relative to the print carriage, in a state where the print carriage is positioned at a capping position at which the nozzle surface of the ink head is covered with the cap.

9. The printer according to claim 1, wherein the sub-carriage includes a lifting mechanism to raise and lower the temperature sensor.

10. The printer according to claim 1, wherein the sub-carriage includes a mover to move the temperature sensor in a direction parallel or substantially parallel to a surface of the medium and in a direction intersecting a direction of movement of the sub-carriage.

11. The printer according to claim 1, wherein a range in which the temperature is measured by the temperature sensor is changed according to an area to which the ink is ejected in the surface of the medium.

* * * * *